(12) United States Patent
Evangelista Vitalino Cardoso et al.

(10) Patent No.: US 12,195,673 B2
(45) Date of Patent: Jan. 14, 2025

(54) METHOD FOR PRODUCING BIOFUELS INVOLVING THE PYROLYSIS OF MACROPHYTE BIOMASS

(71) Applicants: SENAI-SERVICO NACIONAL DE APRENDIZAGEM INDUSTRIAL, Três Lagoas (BR); RIO PARANA ENERGIA S.A., Três Lagoas (BR)

(72) Inventors: Danielle Evangelista Vitalino Cardoso, Três Lagoas (BR); Junior Da Silva Camargo, Três Lagoas (BR); Paulo Renato Dos Santos, Campo Grande (BR); Sonia Tomie Tanimoto, Três Lagoas (BR); Fernando Alves Ferreira, Três Lagoas (BR); Layssa Aline Okamura, Três Lagoas (BR)

(73) Assignees: SENAI-SERVICO NACIONAL DE APRENDIZAGEM INDUSTRIAL, Três Lagoas (BR); RIO PARANA ENERGIA S.A., Três Lagoas (BR)

( * ) Notice: Subject to any disclaimer, the term of this patent is extended or adjusted under 35 U.S.C. 154(b) by 0 days.

(21) Appl. No.: 18/032,645

(22) PCT Filed: Nov. 3, 2021

(86) PCT No.: PCT/BR2021/050481
§ 371 (c)(1),
(2) Date: Apr. 19, 2023

(87) PCT Pub. No.: WO2022/094682
PCT Pub. Date: May 12, 2022

(65) Prior Publication Data
US 2023/0383191 A1    Nov. 30, 2023

(30) Foreign Application Priority Data
Nov. 3, 2020    (BR) .......................... 102020022444-1

(51) Int. Cl.
*C10C 1/19*    (2006.01)
*B09B 3/40*    (2022.01)
(Continued)

(52) U.S. Cl.
CPC ................ *C10G 1/002* (2013.01); *C10C 1/19* (2013.01); *C10G 45/08* (2013.01); *C10G 2300/1014* (2013.01)

(58) Field of Classification Search
CPC .......... B09B 3/40; C10B 49/02; C10B 49/10; C10B 53/02; C10B 57/10; C10C 1/19;
(Continued)

(56) References Cited

U.S. PATENT DOCUMENTS 4,289,625 A    9/1981    Tarman
2012/0308989 A1    12/2012    Barclay
(Continued)

FOREIGN PATENT DOCUMENTS

BR    PI0900426 A2    12/2010
BR    PI1103203 A2    7/2013
(Continued)

OTHER PUBLICATIONS

International Search Report issued in corresponding International Application No. PCT/BR2021/050481 dated Feb. 15, 2022, pp. 1-3, English Translation.

*Primary Examiner* — Ellen M McAvoy
*Assistant Examiner* — Chantel Graham
(74) *Attorney, Agent, or Firm* — Carter, DeLuca & Farrell LLP

(57) ABSTRACT

A method of producing biofuels, based on pyrolysis of biomass from macrophytes, includes: pre-treatment of biomass, including processes of drying and crushing the biomass, followed by injection of pre-treated biomass into a pyrolysis reactor; biomass pyrolysis in pyrolysis reactor; a (Continued)

first separation of products; a second separation of products; a third separation of products; burning or collecting gases, wherein the method produces at least four different types of products, including: biochar, pyroligneous extract, vegetable tar and synthesis gas; whereby, the biochar product is collected in the first product separation through the use of a cyclone, the pyroligneous extract product is collected in the second product separation through the use of a condenser, the vegetable tar product is collected in the third product separation through the use of a centrifuge, and the synthesis gas product is collected in the gas burning or collecting step.

16 Claims, 2 Drawing Sheets

(51) Int. Cl.
*C10B 49/02* (2006.01)
*C10B 49/10* (2006.01)
*C10B 57/10* (2006.01)
*C10C 5/00* (2006.01)
*C10G 1/00* (2006.01)
*C10G 45/08* (2006.01)
*C10K 1/04* (2006.01)

(58) Field of Classification Search
CPC .. C10C 5/00; C10G 1/002; C10G 2300/1014; C10G 3/46; C10G 3/49; C10G 3/50; C10G 45/08; C10K 1/026; C10K 1/04; F23G 2207/113; F23G 2209/26; F23G 5/027; F23G 5/033; F23G 5/04; F23J 15/027; F23J 15/06; Y02E 50/10
See application file for complete search history.

(56) References Cited

U.S. PATENT DOCUMENTS

| 2014/0193898 A1 | 7/2014 | Smith |
| 2017/0183588 A1 | 6/2017 | Vieslet |

FOREIGN PATENT DOCUMENTS

| BR | 102012005977 A2 | 4/2015 |
| BR | 112014016621 A2 | 6/2017 |
| BR | 112015010043 A2 | 7/2017 |
| BR | 102018014640 A2 | 1/2020 |
| KR | 20100048801 A | 5/2010 |
| WO | 2009158028 A2 | 12/2009 |

…

METHOD FOR PRODUCING BIOFUELS INVOLVING THE PYROLYSIS OF MACROPHYTE BIOMASS

CROSS REFERENCE TO RELATED APPLICATIONS

The present application is a national stage application of International Application No. PCT/BR2021/050481, filed Nov. 3, 2021, which claims the benefit of and priority to Brazil patent application Ser. No. 102020022444-1, filed Nov. 3, 2020, the entire contents of each of which are hereby incorporated by reference herein in their entirety.

FIELD OF INVENTION

The present invention falls within the field of waste treatment, particularly in the field of treatment of waste from water reservoirs, such as dams, dams of hydroelectric plants, lakes, among others. In particular, the present invention falls within the field of waste treatment comprising aquatic macrophytes in water reservoirs.

Additionally, the present invention is part of the field of energy generation through pyrolysis, particularly in the field of energy generation through pyrolysis of biomass of plant origin, in particular plant biomass from aquatic macrophytes.

Additionally, the present invention is part of the field of production of biochar and light bio-oils, which in turn can be used in various industries, including their use as a raw material for the production of other molecules of marketing interest.

STATE OF THE ART

Aquatic macrophytes are plants that grow in various biomes with plenty of water, and can take the form of amphibious plant, emergent plant, submerged-fixed plant, submerged-free plant, fixed-leaf-floating plant, free-floating plant and epiphyte. The excessive growth of macrophytes can completely affect water mirrors or the bottom of reservoirs, compromising navigation, fishing, recreation, among other activities. Additionally, its uncontrolled proliferation creates favorable conditions for the development of vectors of water-borne diseases, in addition to impairing the generation of electricity in hydroelectric plants by causing clogging and crusting in propellers and turbines. In order to avoid such harm, large volumes of financial resources are continuously directed to the removal of macrophyte surplus, making these plants a permanent cost in several industries.

There are now several uses for aquatic macrophyte biomass, such as biosorption, phytoremediation, phytochemical production, fertilizers, fish supplements and biogas. However, due to the high rate of reproduction of aquatic macrophytes, a significant part of their biomass still does not have an appropriate destination. Furthermore, none of the state-of-the-art alternatives is able to efficiently add value to such biomass.

In particular, the state of the art fails to anticipate biomass processing solutions from macrophytes belonging to the most abundant and relevant species, in particular those that commonly grow in tropical environments, including the species: *Eichhornia crassipes, Salvinia auriculata, Nymphoides indica, Egeria najas, Thypha domingensis, Pistia stratiotes, Egeria densa, Ceratophyllum demersum, Hydrocotyle ranunculoides, Hydrilla verticillata, Azolla filiculoides, Ipomoea carnea, Polygonum hispidium, Polygonum ferrugineum, Urochloa arrecta, Eichhornia azurea, Myriophyllum aquaticum*.

One of the alternatives that have been explored in adding value to plant residues is the pyrolysis method, which basically consists of the thermal degradation of said residues in the total or partial absence of oxygen, giving rise to liquid, solid and gaseous products. Despite being an interesting alternative, pyrolysis processes have not yet been applied effectively to macrophyte biomass, including the species mentioned above. Furthermore, pyrolysis processes are generally structured to optimally produce only a specific type of product, which makes them unable to adapt their production to meet fluctuations in market demands.

OBJECTIVES OF THE INVENTION

In view of the technical problems of the state of the art, the present invention aims to provide a solution that simultaneously allows the disposal of macrophyte waste from water reservoirs and the addition of value to such waste through the production of biofuels and other products of marketing interest via pyrolysis of macrophyte biomass.

Additionally, the present invention aims to provide a biofuel production method that can quickly pivot its production in order to maximize at least one specific product, that is, a process that can easily, through simple adjustments, redirect its production to meet fluctuating market demands.

The present invention also intends, alternatively, to provide a method of producing biofuels based on pyrolysis of macrophyte biomass, said biomass coming from at least one of the following species: *Eichhornia crassipes, Salvinia auriculata, Nymphoides indica, Egeria najas, Thypha domingensis, Pistia stratiotes, Egeria densa, Ceratophyllum demersum, Hydrocotyle ranunculoides, Hydrilla verticillata, Azolla filiculoides, Ipomoea carnea, Polygonum hispidium, Polygonum ferrugineum, Urochloa arrecta, Eichhornia azurea, Myriophyllum aquaticum*, or any combination thereof.

BRIEF DESCRIPTION OF THE INVENTION

The present invention relates to a method of producing biofuels based on pyrolysis of macrophyte biomass comprising the steps of:
  pre-treatment of biomass, including biomass drying and crushing processes, followed by injection of pre-treated biomass into a pyrolysis reactor;
  biomass pyrolysis in pyrolysis reactor;
  first separation of products;
  second separation of products;
  third separation of products;
  burning or collecting gases;
whereby, a first product of the biochar type is collected in the first separation of products through the use of a cyclone; a second product of the pyroligneous extract type is collected in the second product separation through the use of a condenser; a third vegetable tar type product is collected in the third product separation through the use of a centrifuge; and a fourth product of the synthesis gas type is collected in the step of burning or collecting gases.

It should also be considered that the production of at least one of said products can be maximized by adjusting the execution parameters of at least one of the steps.

According to an alternative configuration of the present invention, the products resulting from said method are subjected to improvement processes through hydrodeoxygenation processes using catalysts based on nickel and molybdenum or cobalt and molybdenum supported on alumina, and this type of improvement process promotes the removal of oxygen from the product.

According to another alternative configuration of the present invention, the products resulting from said method are subjected to improvement processes through catalyzed cracking with zeolites resulting in the removal of oxygen from the product in the form of carbon dioxide.

According to the present invention, the maximization of the vegetable tar product comprises making adjustments in the injection of biomass in a pyrolysis reactor following the parameters:
biomass/air ratio of 0.2-0.8;
biomass injection speed of 3-15 kg/h.
or even by adjusting the temperature for carrying out the pyrolysis step at 150-650° C.

Additionally, maximizing the pyroligneous extract product includes making adjustments to the injection of biomass in a pyrolysis reactor following the parameters:
biomass/air ratio of 0.1-0.3;
biomass injection speed of 1-10 kg/h.
or, by adjusting the temperature for carrying out the pyrolysis step at 150-450° C.

In addition, the maximization of the biochar product comprises adjusting the temperature for carrying out the pyrolysis step to 120-350° C.

Additionally, maximizing the synthesis gas product includes adjusting the temperature for carrying out the pyrolysis step to 700-1000° C.

According to an alternative configuration of the present invention, the macrophyte biomass comes from at least one of the following species: *Eichhornia crassipes, Salvinia auriculata, Nymphoides indica, Egeria najas, Thypha domingensis, Pistia stratiotes, Egeria densa, Ceratophyllum demersum, Hydrocotyle ranunculoides, Hydrilla verticillata, Azolla filiculoides, Ipomoea carnea, Polygonum hispidium, Polygonum ferrugineum, Urochloa arrecta, Eichhornia azurea, Myriophyllum aquaticum*; or any combination thereof.

According to another alternative configuration of the present invention, the pyroligneous extract product has a moisture content of 55-80%, pH of 1-5, density of 1-1.5 kg/L and acidity value of 0.001-0.01 mg KOH/mg.

According to yet another alternative configuration of the present invention, the vegetable tar product has in its composition: 31-84% carbon; 1-7% hydrogen; 12-72% oxygen; and 12-72% nitrogen. Since, said pyroligneous extract has a higher calorific value of 30-36 MJ/kg.

BRIEF DESCRIPTION OF THE DRAWINGS

The figures presented by this document should be interpreted merely as illustrative configurations, and should not be understood as limitations of the configurations of the present invention.

DETAILED DESCRIPTION OF THE INVENTION

Figure 1:
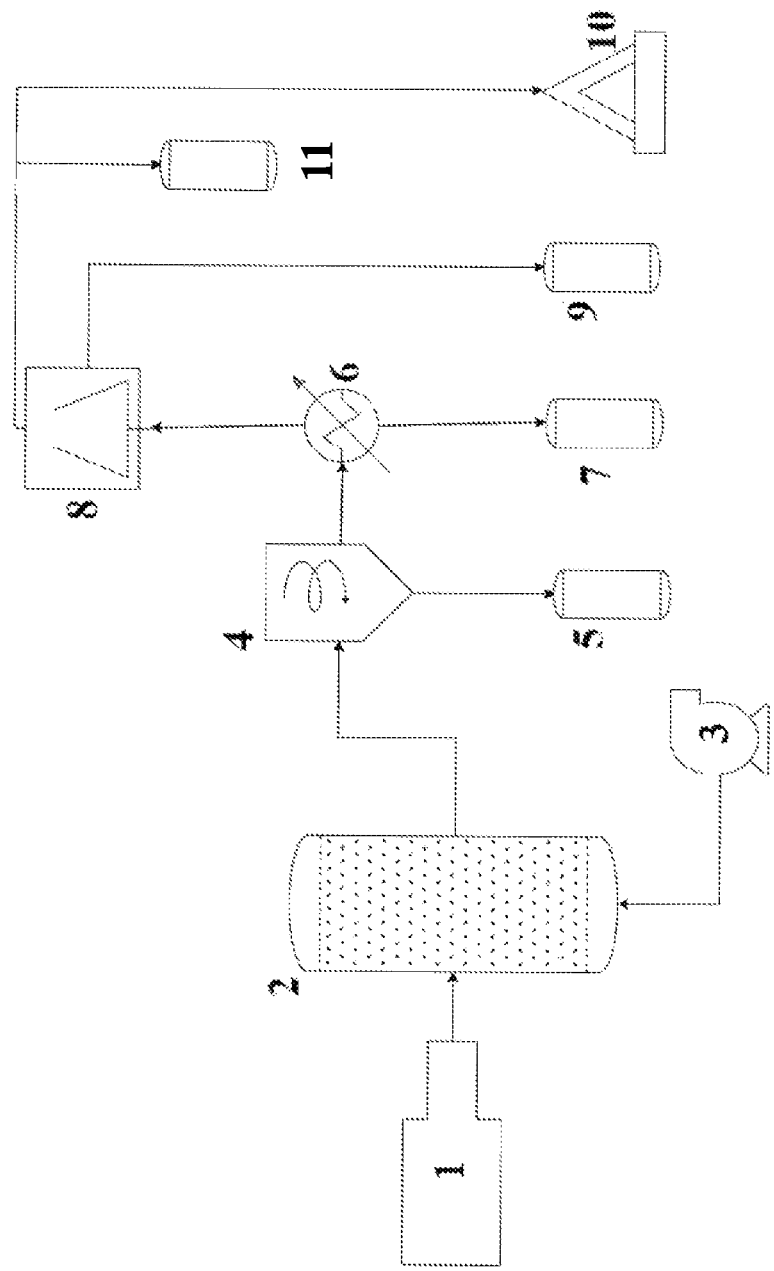
FIG. 1—Illustrative flowchart of the equipment involved in the execution of the biofuel production method according to the preferred configuration of the present invention.
Figure 2:
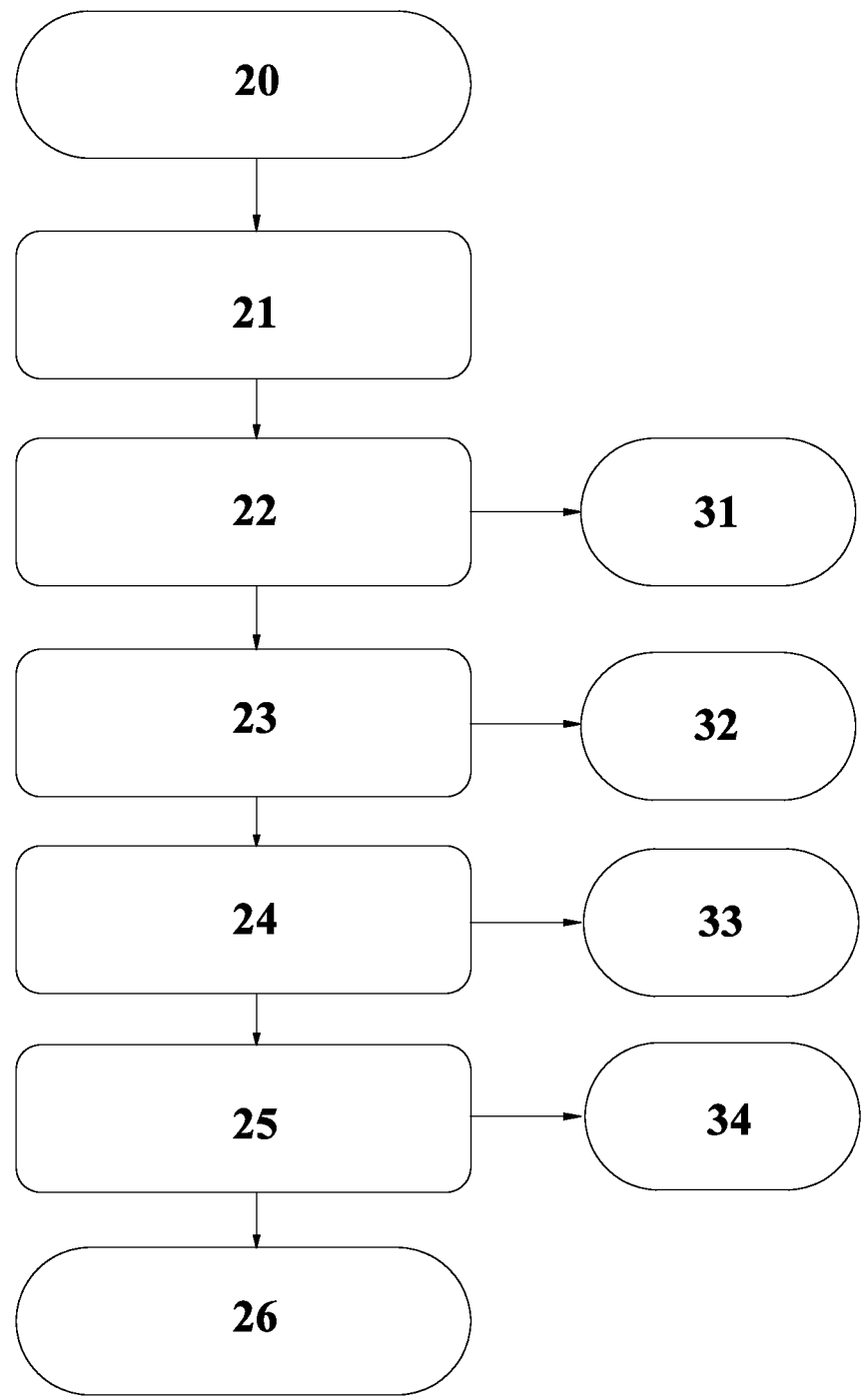
FIG. 2—Flowchart illustrating the execution steps and products collected from the biofuel production method according to the preferred configuration of the present invention.

The present invention relates to a method of producing biofuels based on pyrolysis of macrophyte biomass. According to the mentioned method, the biomass is initially subjected to a pre-treatment 20 so that it can be suitable for the subsequent processes, in particular, to adapt to the pyrolysis step 21. After receiving pre-treatment, the macrophyte biomass is injected into reactor 2 by means of an injection screw 1, said injection preferably taking place through the lower portion of reactor 2. After the injection of the biomass, the biomass pyrolysis step is started 21, following predetermined parameters of duration, temperature, heating ramp, among others. During the pyrolysis step, a plurality of products are formed, including several biofuels, which are then subjected to successive separation steps. Once the macrophyte biomass pyrolysis step is finished, the resulting products are subjected to a first separation 22, carried out by means of a cyclone-type equipment 4. In this first step, a first solid phase is separated, which corresponds to the biochar product 31, and this product is collected and stored in a first container 5. Then, the portion not collected in the container 5 is directed to a second separation 23, carried out through from a condenser 6. In this second step, a first condensation fraction corresponding to the product pyroligneous extract 32 is separated, and this product is collected and stored in a second container 7. Similarly, the portion not collected in the previous steps is directed to a third separation 24, carried out by means of a centrifuge 8. In this step, a phase corresponding to the vegetable tar product 33 is separated, and this product is collected and stored in a third container 9. Finally, the portion not collected in the previous steps, basically consisting of non-condensable gases and vapors, is destined to a gas burning or collecting step 25. In this step, the gas can be burned, being later released, or it can have part or the whole of its components collected and stored in a fourth container 11, corresponding to the synthesis gas product 34.

According to the preferred configuration of the present invention, the pre-treatment step 20 involves a first drying of the biomass, followed by a crushing of the biomass and a final drying. The first drying is preferably carried out in the open air until the biomass has a humidity below 40%, preferably below 25%, even more preferably below 20%. The crushing of the dry biomass, resulting from the first drying step, must be carried out in order to generate a product with a granulometry of 0.1-5 mm, preferably 1-5 mm, even more preferably 2-5 mm. The crushing step can be conducted by any means and equipment provided that the granulometry parameters as specified are observed. Once properly crushed, the biomass is subjected to a second drying until its moisture content is below 18%. It is important to point out that, for the production of any product, the raw material must be free of impurities and have ash content below 3%. Additionally, in order to achieve better yields in the production of different products through pyrolysis, the biomass must have a volatile content of 350%, fixed carbon of <25% and lignin content of 310%. After such conditions have been met, the pre-treatment step is completed and the biomass is ready to be injected into reactor 2 for pyrolysis.

The injection of biomass resulting from pretreatment 20 into a reactor 2 is preferably carried out through the bottom of said reactor 2. The injection is conducted by means of an injection screw 1, according to a specific ratio of biomass/air, the air being supplied by an air compressor 3. The biomass injection is also performed according to a biomass injection speed, which corresponds to the amount of biomass injected per hour (Kg/h). In order to maximize the production of each specific product, it is necessary to adjust the biomass injection conditions as described later. It is worth mentioning that the biomass injection speed must always be compatible with the specific biomass/air ratio to maximize the production of each product.

After injecting the biomass, the biomass pyrolysis step 21 begins. The pyrolysis 21 is performed according to a predefined temperature range specific to the product whose production is to be maximized. Biomass pyrolysis 21 is carried out in pyrolysis reactor 2, lasting 2-15 s, preferably 2-10 s, even more preferably 2-5 s. At this step, different types of products are formed through thermal decomposition, including biochar 31, pyroligneous extract 32, vegetable tar 33 and synthesis gas 34. However, such products are still mixed, making successive separation steps necessary, as described below.

According to the preferred configuration of the present invention, said reactor 2 is preferably of the fluidized bed reactor type. According to an alternative configuration, said reactor 2 can be of any of the following types: bubbling fluidized bed reactor, circular fluidized bed reactor, fixed bed reactor or rotating bed reactor. The method described by the present invention can be carried out with any of the types of reactors mentioned, provided that the biomass injection conditions, temperature and duration of biomass pyrolysis, among other determining conditions in the production of products, are observed. According to an alternative configuration, reactor 2 is a fluidized bed reactor Bioware.

After performing the pyrolysis of biomass 21 in a reactor 2, the pyrolysis products are subjected to a first separation 22, performed by means of a cyclone-type equipment 4. Preferably, the execution of the first separation 22 must be carried out in the temperature range 300-450° C. This first separation 22 by means of a cyclone 4 allows the separation of a solid phase and a gaseous phase. Once separated, the solid phase is collected and stored in a first container 5. Said solid phase corresponds to the biochar product 31.

The material not collected in container 5 is then directed to a second separation 23, performed by means of a condenser 6. According to the preferred configuration of the present invention, said condenser 6 should preferably operate in the temperature range of 20-35° C. and should not exceed 35° C. Upon entering the condenser, the gases and vapors begin to condense allowing the separation of products. The first condensation phase is collected and stored in a second container 7, while the other products go to the next separation step. The first condensation phase stored in the second container 7 corresponds to the pyroligneous extract product 32.

The product not collected in the other steps goes to a third separation 24, performed by means of a centrifuge 8. According to a preferred configuration of the present invention, said centrifuge operates at a frequency of 15-45 Hertz, preferably 20-45 Hertz, even more preferably at a frequency of 35-45 Hertz. Once in the centrifuge, the mists begin to separate by the combined effect of coalescence and impact, enabling the separation and collection of a fraction, which is then subsequently stored in a third container 9. The fraction stored in a third container 9 corresponds to the product vegetable tar 33.

The remaining products, which basically consist of non-condensable vapors, are then directed to the last step of the process, the gas burning or collecting step 25. In this step, as the name implies, the remaining products can be burned in a gas burner 10 or collected and stored in a fourth container 11, whereby said product stored in a fourth container 11 corresponds to the synthesis gas product 34. The synthesis gas 34 stored in a fourth container 11 can correspond to all or only part of the products not collected in the previous steps. The products not collected and stored in a container 11 are all intended for burning in a gas burner 10, the burning product being able to be sent to the release step 26 into the atmosphere.

According to the preferred configuration of the present invention, the biofuel production method based on pyrolysis of macrophyte biomass is an adaptable production process, capable of changing its production flow in order to maximize the production of at least one of its products separately, including the following products: biochar 31, pyroligneous extract 32, vegetable tar 33 and synthesis gas 34. Alternatively, the present biofuel production based on macrophyte biomass pyrolysis is capable of maximizing the production of at least two of its products simultaneously, among which are included: biochar 31, pyroligneous extract 32, vegetable tar 33 and gas of synthesis 34.

According to the present invention, maximizing the production of vegetable tar 33 is achieved by performing at least one of the following adjustments:
  the biomass/injection air ratio in reactor 2 must be 0.2-0.9, preferably 0.5-0.9
  the biomass injection rate in reactor 2 must be 10-25 kg/h, preferably 10-20 kg/h, even more preferably 10-15 kg/h;
  the temperature for carrying out pyrolysis of biomass 21 should be 460-650° C., preferably 460-650° C., even more preferably 460-550° C.

According to the present invention, maximizing the production of pyroligneous extract 32 is achieved by performing at least one of the following adjustments:
  the biomass/injection air ratio in reactor 2 must be 0.1-0.4, preferably 0.1-0.3;
  the biomass injection rate in reactor 2 should be 1-9 kg/h, preferably 1-7 kg/h, even more preferably 1-5 kg/h;
  the temperature for carrying out pyrolysis of biomass 21 should be 310-450° C., preferably 325-450° C., even more preferably 350-450° C.

According to the present invention, maximizing the production of biochar 31 is achieved by performing at least one of the following adjustments:
  the temperature of carrying out pyrolysis of biomass 21 should be 120-300° C., preferably 150-300° C., even more preferably 200-300° C.

According to the present invention, maximization of synthesis gas production 34 is achieved by performing at least one of the following adjustments:
  the temperature for carrying out pyrolysis of biomass 21 should be 700-1000° C., preferably 660-950° C., even more preferably 660-900° C.

According to an alternative configuration of the present invention, the method of producing biofuels based on pyrolysis is performed with biomass from macrophytes belonging to at least one of the following species: *Eichhornia crassipes, Salvinia auriculata, Nymphoides indica, Egeria najas, Thypha domingensis, Pistia stratiotes, Egeria densa, Ceratophyllum demersum, Hydrocotyle ranunculoides, Hydrilla verticillata, Azolla filiculoides, Ipomoea carnea, Polygonum hispidium, Polygonum ferrugineum, Urochloa arrecta, Eichhornia azurea, Myriophyllum aquaticum*. Alternatively, said method can be performed with biomass from any combination of the mentioned macrophyte species. The described method is capable of producing final products with substantially homogeneous physical-chemical characteristics between different production batches, regardless of the macrophyte biomass composition used to produce each batch. That is, the present invention offers a robust way of producing biofuels from macrophyte biomass.

According to the present invention, the pyroligneous extract 32 collected in a second container 7 has higher density and moisture and lower acidity compared to fuel oil derived from petroleum. More specifically, the pyroligneous extract 32 produced by the present invention has a moisture content of 55-80%, a pH of 1-6, preferably 4-6, a density of 1-1.5 and an acid number of 0.0001-0.5 mgKOH/mg, preferably 0.01-0.05 mgKOH/mg. It is noteworthy that the density of the pyroligneous extract 32, as revealed, makes it ideal for application as a biofuel, as it is not too high to cause clogging of injection nozzles, nor excessively low to the point of reducing the efficiency of its burning in combustion chambers. Additionally, said extract has an optimized acidity index, so that it does not cause acidic corrosion of the metallic components of a combustion engine, which would greatly impair the operation and engine longevity. Furthermore, said optimized acidity index provides greater thermal stability to the pyroligneous extract 32, improving its burning performance in combustion chambers.

According to the present invention, the vegetable tar 33 produced by the present invention and collected in a third container 9 has in its composition (% weight): 31-84% carbon, 1-7% hydrogen, 12-72% of oxygen, 12-72% of nitrogen. Additionally, said vegetable tar 33 has a higher calorific value of 30-36 MJ/kg. The composition specified for vegetable tar, which is the result of the present invention, has high levels of hydrogen and oxygen, which gives it a higher calorific value than traditional vegetable tar. This is because higher levels of hydrogen and oxygen imply a greater number of molecular bonds between carbon-hydrogen and carbon-oxygen atoms, whose binding energy is higher than the carbon-carbon bond, which are more abundant in traditional vegetable tar.

According to another alternative configuration of the present invention, the products obtained in the method described above can be subjected to improvement processes, aiming to optimize its characteristics for its use as biofuel. In particular, products classified as bio-oil, which include vegetable tar and pyroligneous extract, are the products preferably submitted to such improvement processes. Said processes include: chemical catalysis processes, which aim to remove oxygen from the bio-oil, in order to give it greater stability.

According to the same configuration, the improvement of bio-oil is carried out through a process of hydrodeoxygenation. This process is carried out under high pressure and moderate temperature, with oxygen being removed in the form of water or carbon dioxide. Oxygen removal is optimized by the presence of catalysts based on nickel and molybdenum and/or based on cobalt and molybdenum, supported on alumina.

Alternatively, the improvement is carried out by a cracking process catalyzed by zeolites. In this process, the removal of oxygen from the bio-oil is done in the form of carbon dioxide emissions in the presence of a zeolite catalyst.

Within the scope of the present invention, the term "pyrolysis" is intended to indicate: a thermochemical conversion, which can be described as a thermal degradation in the total or partial absence of oxygen, giving rise to liquid, solid and gaseous products. The main parameters that influence the pyrolysis process are: residence temperature, residence time, heating rate, pressure, biomass properties and particle size.

Within the scope of the present invention, the term "biochar" is intended to indicate: a solid product generated in the pyrolysis process, with carbon being the predominant compound, corresponding to about 85%, while oxygen and hydrogen are present in small quantities. Due to the low oxygen content, the lower calorific value of biochar can reach 32 Mj/kg, which is higher compared to that of biomass or bio-oil. Biochar can be used in soil conditioning, moisture control, contaminant removal, carbon fixation, energy generation and as a fertilizer.

Within the scope of the present invention, the term "bio-oil" is intended to indicate: a complex mixture of highly oxygenated organic compounds, such as phenols, nitrogenous compounds, carboxylic acids, hydrocarbons, sugars, with a high water content and a density higher than that of fuel oils. Such compounds are formed by the processes of depolymerization and fragmentation of lignin, cellulose and hemicellulose. Bio-oil is also known as pyrolysis oil, bio-crude oil, wood liquid, smoke liquid, wood distillate, pyroligneous acid, pyroligneous extract, liquid wood, tar acid and vegetable tar.

Within the scope of the present invention, the term "pyroligneous extract" is intended to indicate: a lower density fraction of a bio-oil produced by pyrolysis of plant biomass.

Within the scope of the present invention, the term "plant tar" is intended to indicate: a higher density fraction of a bio-oil produced by pyrolysis of plant biomass.

Within the scope of the present invention, the term "synthesis gas" is intended to indicate: a mixture of gases, generally difficult to condense, containing varying proportions of carbon monoxide (CO), hydrogen (H2), carbon dioxide (CO2), methane (CH4), traces of sulfur (S), other light hydrocarbon impurities.

Within the scope of the present invention, the term "higher calorific value" is intended to indicate: the amount of energy per unit mass (or volume, in the case of gases) released in the oxidation of a given fuel, given by the sum of the energy released in the form of heat and the energy expended in vaporizing the water that is formed.

Within the scope of the present invention, the term "low calorific value" is intended to indicate: the amount of energy per unit mass (or volume, in the case of gases) released in the oxidation of a given fuel, given by the energy released in the form of heat.

The invention described here offers an alternative and more environmentally friendly route for the production of fuels, as it does not collaborate with the extraction and emission of underground carbon (oil) into the atmosphere. Additionally, the present invention is capable of adding value to biomass, being an alternative not only for waste disposal, but also becoming a potential source of revenue.

Compared to other state-of-the-art solutions, the present invention also has the advantage of having an adaptable process, capable of having its production quickly pivoted to maximize at least one specific product, such pivoting being carried out by simply changing the parameters related to the injection of biomass into the reactor, pyrolysis temperature, among others. Due to its adaptability, the present invention is able to dynamically adapt to the ever-fluctuating demands of the energy and oil and gas markets, being a highly innovative and inventive alternative.

Having described a preferred embodiment example, it should be understood that the scope of the present invention covers other possible variations, being limited only by the content of the appended claims, including the possible equivalents.

The invention claimed is:
1. A method for producing biofuels involving the pyrolysis of macrophyte biomass comprising:
   pre-treating biomass, including biomass drying and crushing processes;
   injecting the pre-treated biomass into a pyrolysis reactor with an injection screw to perform pyrolysis of the biomass;
   transferring a plurality of products resulting from pyrolysis to a cyclone configured to carry out a first separation of products, the first separation allowing separation of a first product of a biochar type which is directed to storage in a first container;
   transferring a portion not collected in the first container to a condenser configured to perform a second separation of products, the second separation allowing separation of a second product of a pyroligneous extract type which is directed to storage in a second container;
   transferring a portion not collected in the second container to a centrifuge configured to perform a third separation of products, the third separation allowing separation of a third product of a tar type vegetable which is directed to storage in a third container;
   transferring a portion not collected in the second container to one of:
      a fourth container, wherein a fourth stored product corresponds to a synthesis gas type product; or
      a burning nozzle configured to burn the fourth synthesis gas-type product;
   wherein the method is configured to produce the first, second, third, and fourth products from the same biomass,
   wherein the method is configured to allow maximization of production of any of first, second, third, and fourth products, individually or simultaneously, by applying adjustments to execution parameters of at least one of the steps.

2. The method according to claim 1, wherein the resulting products are subjected to a hydrodeoxygenation process using catalysts based on nickel and molybdenum or cobalt and molybdenum, supported on alumina.

3. The method according to claim 1, wherein the resulting products are subjected to catalyzed cracking with zeolites.

4. The method according to claim 1, wherein maximization of the vegetable tar product comprises carrying out adjustments in the injection of biomass in a pyrolysis reactor following parameters wherein a biomass/air ratio is 0.5-0.9 and a biomass injection rate is 10-15 kg/h.

5. The method according to claim 1, wherein maximization of the vegetable tar product comprises adjusting a temperature for carrying out the pyrolysis to 460-650° C.

6. The method according to claim 1, wherein maximization of the pyroligneous extract product comprises carrying out adjustments in the injection of biomass in a pyrolysis reactor following the parameters wherein a biomass/air ratio is 0.1-0.4 and an amount of biomass injected per time is from 1-9 kg/h.

7. The method according to claim 1, wherein maximization of the pyroligneous extract product comprises adjusting temperature for carrying out the pyrolysis step to 310-450° C.

8. The method according to claim 1, wherein maximization of the biochar product comprises adjusting temperature for carrying out the pyrolysis step to 120-300° C.

9. The method according to claim 1, wherein maximization of the synthesis gas product comprises adjusting temperature for carrying out the pyrolysis step to 660-900° C.

10. The method according to claim 1, wherein the macrophyte biomass comes from at least one of the following species: *Eichhornia crassipes, Salvinia auriculata, Nymphoides indica, Egeria najas, Thypha domingensis, Pistia stratiotes, Egeria densa, Ceratophyllum demersum, Hydrocotyle ranunculoides, Hydrilla verticillata, Azolla filiculoides, Ipomoea carnea, Polygonum hispidium, Polygonum ferrugineum, Urochloa arrecta, Eichhornia azurea, Myriophyllum aquaticum*, and any combination thereof.

11. The method according to claim 1, wherein the pyroligneous extract product has a humidity of 55-80%, a pH of 4-6, a density of 1-1.5 kg/L, and an acidity index of 0.01-0.05 mg KOH/mg.

12. Biofuel based on pyrolysis of biomass from macrophytes obtained by the method of claim 1, wherein the vegetable tar product has 31-84% carbon, 1-7% hydrogen, 12-72% oxygen, and 12-72% nitrogen in its composition.

13. Biofuel based on pyrolysis of biomass from macrophytes obtained by the method of claim 1, wherein the vegetable tar product has a higher calorific value of 30-36 MJ/kg.

14. The method according to claim 1, wherein pre-treating biomass includes:
   a first drying, wherein the biomass is dried until the biomass has a humidity below 40%,
   a first crushing, wherein the biomass is crushed until the biomass has a granulometry of 0.1 to 5 mm, and
   a second drying, wherein the biomass is dried until the biomass has a moisture content below 18%.

15. The method according to claim 1, wherein after pre-treating, the biomass has a volatile content of greater than or equal to 50%, a fixed carbon content of less than or equal to 25%, and a lignin content of less than or equal to 10%.

16. The method according to claim 1, wherein pyrolysis of the biomass is performed in a single step.

* * * * *